(12) United States Patent (10) Patent No.: US 9,120,354 B2
Maehara (45) Date of Patent: Sep. 1, 2015

(54) HEAVY DUTY TIRE

(75) Inventor: Atsushi Maehara, Kobe (JP)

(73) Assignee: SUMITOMO RUBBER INDUSTRIES, LTD., Kobe-shi (JP)

(*) Notice: Subject to any disclaimer, the term of this patent is extended or adjusted under 35 U.S.C. 154(b) by 400 days.

(21) Appl. No.: 13/611,913

(22) Filed: Sep. 12, 2012

(65) Prior Publication Data

US 2013/0098519 A1 Apr. 25, 2013

(30) Foreign Application Priority Data

Oct. 20, 2011 (JP) ................................. 2011-230955

(51) Int. Cl.
  *B60C 11/12* (2006.01)
  *B60C 11/03* (2006.01)
  *B60C 11/13* (2006.01)

(52) U.S. Cl.
  CPC ......... *B60C 11/0306* (2013.04); *B60C 11/1204* (2013.04); *B60C 11/1236* (2013.04); *B60C 11/1369* (2013.04); *B60C 2011/0353* (2013.04); *B60C 2011/0365* (2013.04); *B60C 2200/06* (2013.04)

(58) Field of Classification Search
  CPC  B60C 11/0306; B60C 11/0309; B60C 11/12; B60C 11/1204; B60C 11/1236
  USPC ............... 152/209.1, 209.18, 209.22, 209.25, 152/900–901, DIG. 3
  See application file for complete search history.

(56) References Cited

U.S. PATENT DOCUMENTS

| | | | | | |
|---|---|---|---|---|---|
| 4,756,352 | A | * | 7/1988 | Ogawa et al. | 152/209.14 |
| 4,785,861 | A | * | 11/1988 | Fujiwara | 152/209.14 |
| 5,896,905 | A | * | 4/1999 | Lurois | 152/209.23 |
| 2006/0254684 | A1 | * | 11/2006 | Tamura | 152/209.18 |
| 2009/0038723 | A1 | * | 2/2009 | Thiebaud | 152/209.18 |
| 2010/0186861 | A1 | * | 7/2010 | Ishiguro et al. | 152/209.25 |
| 2012/0216931 | A1 | * | 8/2012 | Shiono | 152/209.18 |

FOREIGN PATENT DOCUMENTS

| | | | |
|---|---|---|---|
| EP | 2210749 | * | 7/2010 |
| JP | 06-183214 | * | 7/1994 |

(Continued)

OTHER PUBLICATIONS

English machine translation of JP06-183214, dated Jul. 1994.*

(Continued)

*Primary Examiner* — Steven D Maki
*Assistant Examiner* — Robert Dye
(74) *Attorney, Agent, or Firm* — Birch, Stewart, Kolasch & Birch, LLP

(57) ABSTRACT

A heavy duty tire includes a tread portion with a pair of circumferentially extending crown main grooves and a pair of circumferentially extending shoulder main grooves to form a crown land portion, a pair of middle land portions and a pair of shoulder land portions, wherein crown main grooves have groove widths of 2-5% of a tread half width, shoulder main grooves have groove widths of 6-9% of the tread half width, crown lateral grooves are provided on the crown land portion to form a plurality of crown blocks, middle lateral grooves are provided on middle land portions, shoulder lateral grooves are provided on shoulder land portions, crown and middle lateral grooves have groove widths of 0.4-2.0 mm, and shoulder lateral grooves have groove widths of 6-9% of the tread half width.

11 Claims, 4 Drawing Sheets

(56) References Cited

FOREIGN PATENT DOCUMENTS

| | | | |
|---|---|---|---|
| JP | 2006-111091 A | | 4/2006 |
| JP | 2008-302710 | * | 12/2008 |
| WO | WO2011/055681 | * | 5/2011 |

OTHER PUBLICATIONS

English machine translation of JP2008-302710, dated Dec. 2008.*

* cited by examiner

HEAVY DUTY TIRE

BACKGROUND OF THE INVENTION

1. Field of the Invention

The present invention relates to a heavy duty tire in which rolling resistance can be reduced while keeping wet grip performance.

2. Description of the Related Art

By the request of energy-saving in recent years, a pneumatic tire with low rolling resistance is required to improve fuel efficiency of passenger cars. Generally, half amount of rolling resistance of tires depends on energy losses caused by deformation of rubber components in tires. Accordingly, in order to prevent a large deformation in a tread portion of a pneumatic tire, it is proposed that reducing the volume of a crown main groove and a shoulder main groove which continuously extend in the tire circumferential direction. Since the tire above has a high compression resistance in the tread portion as to prevent a large deformation, rolling resistance can be reduced.

However, the tire above tends to have low drainage performance, and thereby the wet grip performance can be deteriorated. As previously mentioned, rolling resistance and wet grip performance are in the relation of antinomy.

For improving such antinomy, there is proposed for example Japanese Patent laid open No. 2006-111091, wherein a heavy duty tire with a specified relation between a land ratio of a tread portion and a circumferential rigidity of a block row in a heavy duty tire is proposed.

However, further improved tire is required by the request of energy-saving in recent years.

It is an object of the present invention to provide a heavy duty tire in which rolling resistance can be reduced while keeping wet grip performance.

SUMMARY OF THE INVENTION

In accordance with the present invention, there is provided a heavy duty tire comprising,
a tread portion provided with a pair of crown main grooves disposed on both sides of the tire equator and extending continuously in the tire circumferential direction, and a pair of shoulder main grooves each disposed axially outside crown main grooves and extending continuously in the tire circumferential direction,
a crown land portion between crown main grooves,
a pair of middle land portions between crown main grooves and shoulder main grooves,
a pair of shoulder land portions disposed axially outside of shoulder main grooves, wherein
crown main grooves have groove widths in a range of from 2 to 5% of a tread half width which is an axial distance between the tire equator and a tread edge,
shoulder main grooves have groove widths in a range of from 6 to 9% of the tread half width,
an axial distance between the tire equator and a centerline of one of shoulder main grooves is in a range of from 52 to 68% of the tread half width,
crown lateral grooves are provided on the crown land portion to form a plurality of crown blocks,
middle lateral grooves are provided on middle land portions to form a plurality of middle blocks,
shoulder lateral grooves are provided on shoulder land portions to form a plurality of shoulder blocks,
crown lateral grooves and middle lateral grooves have groove widths in a range of from 0.4 to 2.0 mm, and
shoulder lateral grooves have groove widths in a range of from 6 to 9% of the tread half width.

DETAILED DESCRIPTION

An embodiment of the present invention will be explained below with reference to the accompanying drawings.

Figure 1:
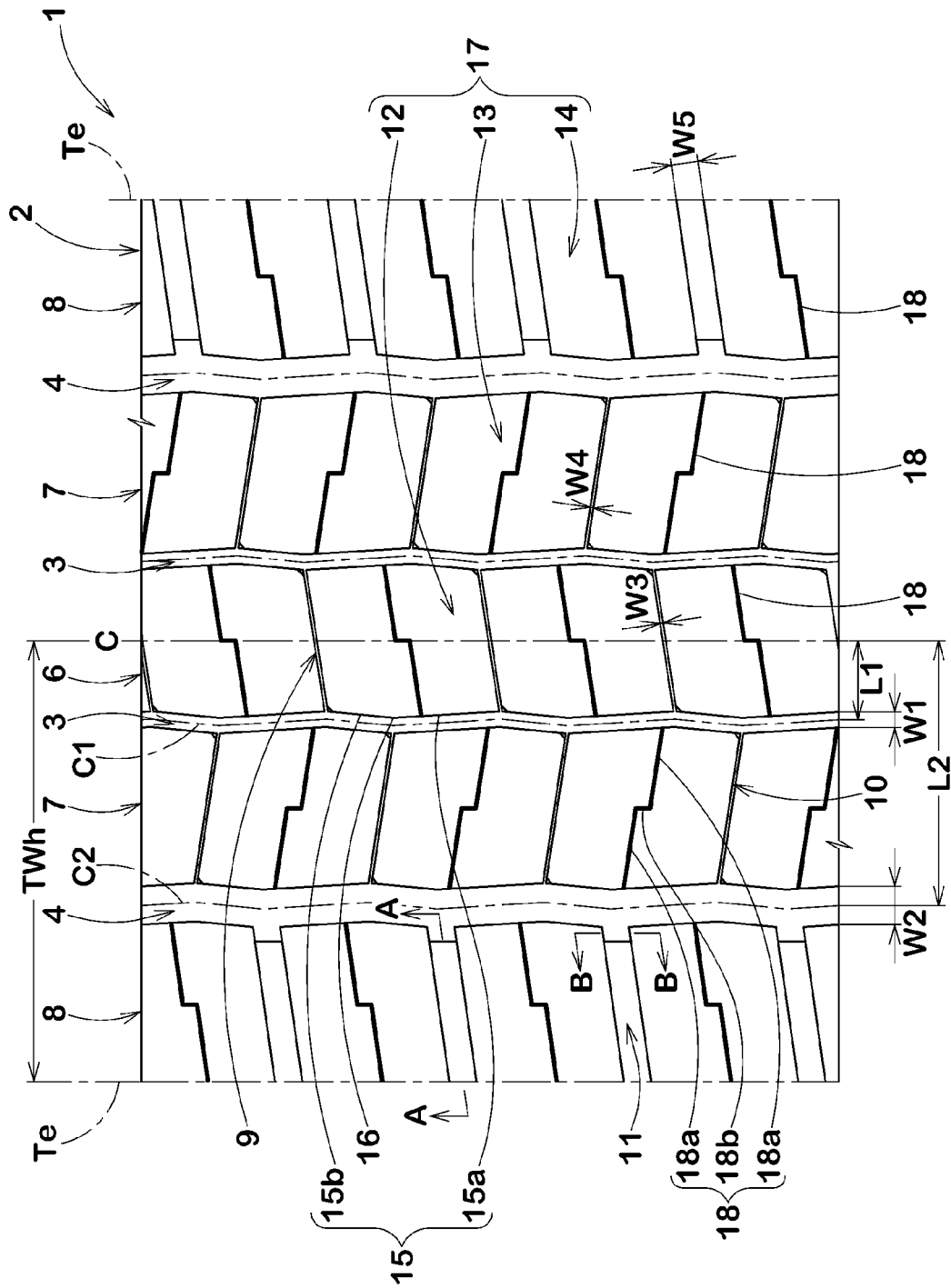
FIG. 1 is a development view of a tread portion of a heavy duty tire showing an embodiment of the present invention.

FIG. 1 shows a tread portion 2 of a heavy duty tire 1 in accordance with the present invention. The tread portion 2 is provided with: a pair of crown main grooves 3 disposed on both sides of the tire equator C and extending continuously in the tire circumferential direction; and a pair of shoulder main grooves 4 disposed axially outside of the crown main groove 3 and extending continuously in the tire circumferential direction.

The tread portion 2 is separated into five land portions by crown main grooves 3 and shoulder main grooves 4 which include: a crown land portion 6 between crown main grooves 3; a pair of middle land portions 7 between crown main grooves 3 and shoulder main grooves 4; and a pair of shoulder land portions 8 disposed axially outside of shoulder main grooves 4. Also, the tread portion 2 has a pair of tread edges Te defining a tread half width Twh which is an axial distance between the tire equator C and one of tread edges Te.

Crown main grooves 3 have widths w1 in a range of from 2 to 5% of the tread half width Twh. By providing such crown main grooves with small widths, a large ground contact area in a center region of the tread portion 2 including the crown and middle land portions 6 and 7 can be obtained. Accordingly, a pressure applied to the tread portion 2 is reduced, and thereby rolling resistance of the tire 1 can be reduced due to the less deformation in the tread portion 2.

Here, the tread edge Te is the axially outermost edge in the ground contact patch. The ground contact patch is defined as the ground contacting area of the tread portion 2 at a camber angle of zero when the tire is mounted on a standard rim and inflated to a standard inner pressure and loaded with a standard tire load. Also, dimensions and the like of portions of the tire 1 have values under a standard unloaded condition that the tire is mounted on the standard wheel rim and inflated to the standard pressure but loaded with no tire load, unless otherwise stated.

The standard wheel rim is a wheel rim officially approved for the tire by standard organization, i.e. JATMA, T&RA, ETRTO and the like. The standard rim is the "standard rim" specified in JATMA, the "Measuring Rim" in ETRTO, and the "Design Rim" in TRA or the like.

The standard pressure is an air pressure for tire specified by the standard organization above. For example, the standard pressure is the "maximum air pressure" in JATMA, the "Inflation Pressure" in ETRTO, and the maximum pressure given in the "Tire Load Limits at various Cold Inflation Pressures" table in TRA or the like.

The standard tire load is a load for tire specified by the standard organization above. For example, the standard load is the "maximum load capacity" in JATMA, the "Load capacity" in ETRTO, and the maximum value given in the above-mentioned table in TRA or the like.

When widths w1 are less than 2% of the tread half width Twh, the drainage performance of the center region in the tread potion 2 tends to be significantly deteriorated. On the other hand, when widths w1 are more than 5%, the ground contact area in the crown and middle land portions 6 and 7 tends to decrease, and thereby rolling resistance of the tire 1 may be increased. From this point of view, widths w1 are preferably set in a range of from 3 to 4% of the tread half width Twh.

The axial distance L1 between the tire equator C and the centerline C1 of one of crown main grooves 3 is set in a range of from 15 to 23% of the tread half width Twh. With this, the width of crown land portion 6 is sufficiently maintained, and thereby a large ground contact area can be obtained around the tire equator C. Moreover, wet grip performance can be improved due to the suitable width of the crown land portion 6 while reducing rolling resistance.

When the distance L1 is less than 15% of the tread half width Twh, a large deformation may be caused in the crown land portion 6 due to such small width thereof, and thereby rolling resistance of the tire 1 may be increased. When the distance L1 is more than 23% of the tread half width Twh, drainage performance may be deteriorated due to such large width of the crown land portion 6, and thereby wet performance of the tire 1 may be decreased. With this, the distance L1 is preferably set in a range of from 17 to 21% of the tread half width Twh.

Shoulder main grooves 4 have width w2 in a range of from 6 to 9% of the tread half width Twh. Namely, widths w2 of shoulder main grooves 4 are greater than widths w1 of crown main grooves 3. When the tire 1 runs on a wet road, such shoulder main grooves 4 can effectively drain so as to improve wet performance.

When widths w2 are less than 6% of the tread half width Twh, drainage performance of shoulder main grooves 4 tend to deteriorated. On the other hand, when widths w2 are more than 9% of the tread half width TWh, widths of middle land portions 7 and/or shoulder land portions 8 tend to become small, and thereby rolling resistance of the tire 1 may be increased. From this point of view, widths w2 are preferably set in a range of from 7 to 8% of the tread half width Twh.

In this embodiment, both crown main grooves 3 and shoulder main grooves 4 have a pair of groove walls extending in parallel each other to form constant widths w1 and w2. With this, when the tire 1 runs on wet road, water film under the tread portion 2 is effectively drained along the tire circumferential direction.

In this embodiment, although both crown main grooves 3 and shoulder main grooves 4 extend in zigzag manner in the tire circumferential direction, straight grooves and/or smoothly curved grooves like s-shaped may be also employed.

The axial distance L2 between the tire equator c and a centerline c2 of one of shoulder main grooves 4 is set in a range of from 52 to 68% of the tread half width Twh to maintain wet performance.

If the distance L2 is less than 52% of the tread half width Twh, rolling resistance of the tire 1 tends to increase due to less rigidity of middle land portions 7 with small widths. If the distance L2 is more than 68% of the tread half width Twh, wet performance tends to be deteriorated due to shoulder land portions with small widths. From this point of view, the distance L2 is preferably set in a range of from 56 to 64% of the tread half width Twh.

In the crown land portion 6, middle land portions 7 and shoulder land portions 8, crown lateral grooves 9, middle lateral grooves 10 and shoulder lateral grooves 11 are provided, respectively. Each of lateral grooves 9, 10 and 11 extending in the tire axial direction improves wet performance by draining water film on a wet road to the axially outside of the tire 1.

Groove widths w3 of crown lateral grooves 9 and widths w4 of middle lateral grooves 10 are set in a range of from 0.4 to 2.0 mm. Namely, groove widths w3 and w4 are set smaller than that of conventional heavy duty tires. Accordingly, each of crown land portion 6 and middle land portions 7 tends to have a large land ratio, and thereby each ground contact pressure is reduced. Therefore, rolling resistance of the tire 1 tends to be reduced due to less deformation of each crown land portion 6 and middle land portions 7.

Here, when groove widths w3 and W4 are less than 0.4 mm, wet performance tends to deteriorate. If groove widths W3 and w4 are more than 2.0 mm, rolling resistance tends to increase due to the low circumferential rigidity of the crown land portions 6 and middle land portions 7. From this point of view, widths w3 and w4 are preferably set in a range of from 1.0 to 1.5 mm.

In this embodiment, although groove widths w3 and w4 are substantially set in the same width, different groove widths may be employed in each groove width w3 and w4. In this case, the groove width w3 of the crown land portion is preferably set smaller than groove widths W4 of middle land portions 7 so as to have improved drain performance to drain water film to the axially outside of the tire 1.

Groove widths w5 of shoulder lateral grooves 11 are set in a range of from 6 to 9% of the tread half width Twh. Namely, groove widths W5 are set larger than groove widths w3 and w5, of crown and middle lateral grooves 9 and 10, and thereby shoulder lateral grooves can drain water film, which was pushed away by the crown and middle land portions 6 and 7, toward the axially outside of the tire 1.

Here, when grove widths w5 are less than 6% of the tread half width Twh, wet performance may deteriorate due to the low drainage performance. When the groove widths w5 are greater than 9%, rolling resistance and driving stability of the tire tend to deteriorate due to the low circumferential rigidity of the shoulder land portions 8. From this point of view, groove widths w5 are preferably set in a range of from 7 to 8% of the tread half width Twh.

As described above, the heavy duty tire 1 in accordance with the present invention has crown main grooves 3, crown lateral grooves 9 and middle lateral grooves 9 each with small groove widths w1, w3 and w4, respectively, and shoulder main grooves 4 and shoulder lateral grooves 11 each with large groove widths w2 and W5. With this, a rigidity of a center region of the tread portion 2 becomes higher, and thereby rolling resistance can be reduced. While, shoulder land portions 8 which has less contribution to rolling performance are provided shoulder main grooves 4 and shoulder lateral grooves 11 each with large groove widths w2 and w5 to improve drain performance. Accordingly, the present invention provides a heavy duty tire in which rolling resistance can be reduced while keeping wet grip performance.

Each of land portions 6 to 8 are formed in a block row with a plurality of blocks 17 are arranged in the tire circumferential direction. Blocks 17 include crown blocks 12, middle blocks 13 and shoulder blocks 14. Namely, the crown land portion 6 is provided with a plurality of crown blocks 12 separated by crown lateral grooves 9. Middle land portions 7 are provided with a plurality of middle blocks 13 separated by middle lateral grooves 10. Shoulder land portions 8 are provided with a plurality of shoulder blocks 14 separated by shoulder lateral grooves 11.

Figure 2:
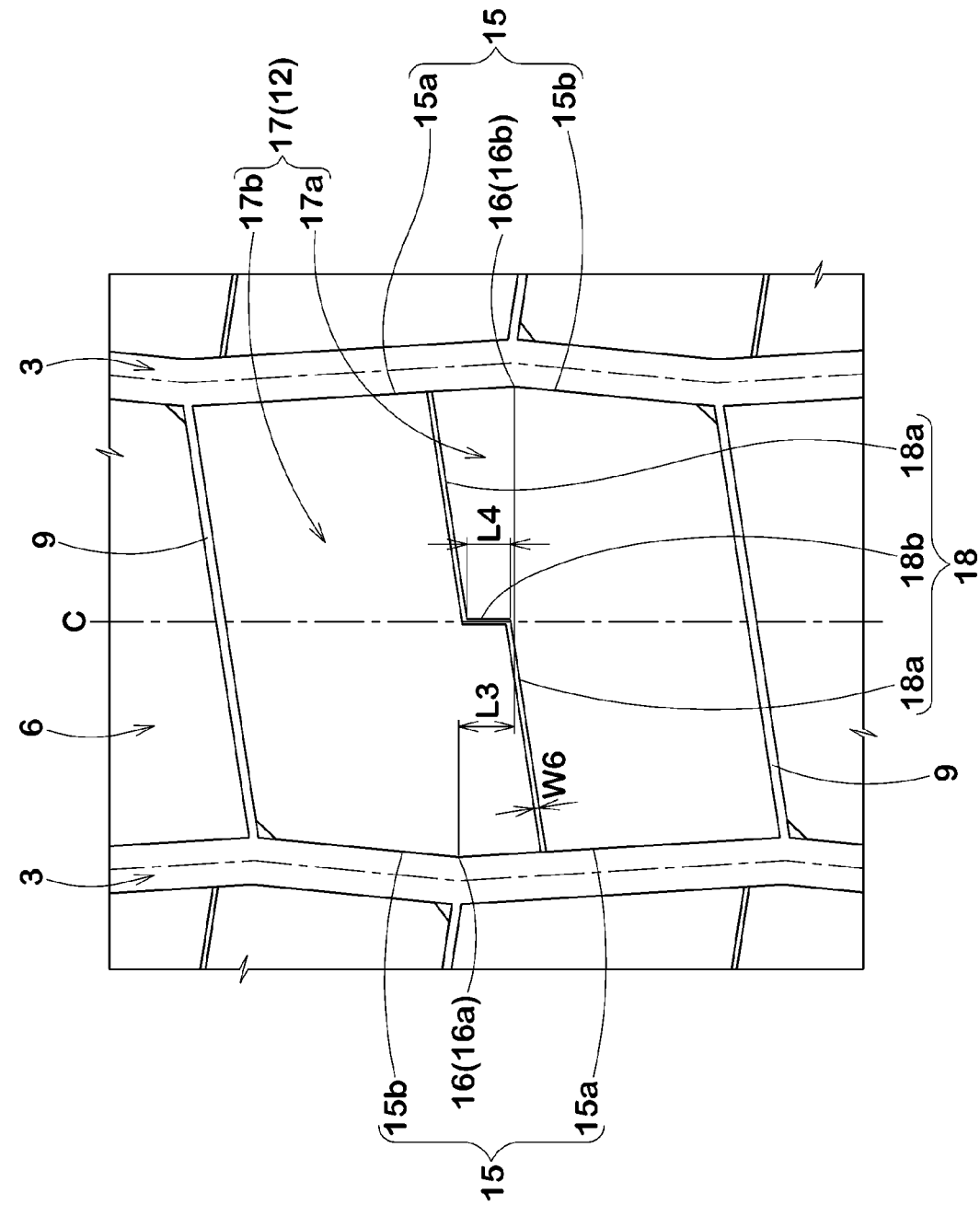
FIG. 2 is a wide view of a crown block in FIG. 1.
Figure 3:
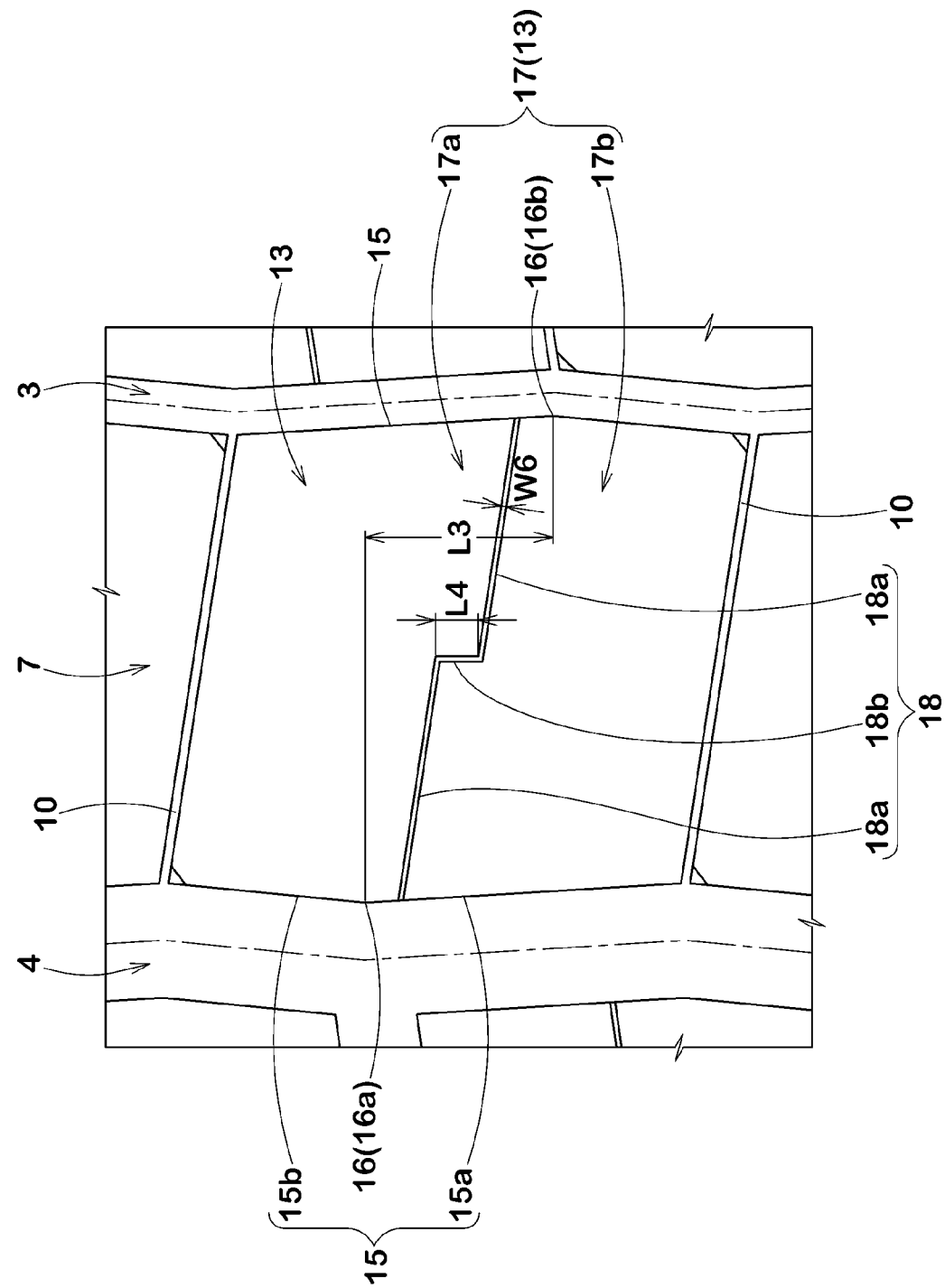
FIG. 3 is a wide view of a middle block in FIG. 1.

FIG. 2 shows an enlarged view of one of crown blocks 12, and FIG. 3 shows an enlarged view of one of middle blocks 13. As shown in FIGS. 2 and 3, each block 17 has a pair of side edges 15 extending in the tire circumferential direction. In crown and middle blocks 12 and 13, each side edge 15 has a bent shape projecting axially outside of the block with a peak point 16 located in the outermost point thereof. Such blocks 17 are able to maintain much more rubber volume between peak points 16 and 16, and thereby rolling-resistance of the tire 1 also decreases due to less deformation of blocks in the tire axial direction.

In order to further decrease rolling resistance of the tire 1, a pair of peak points 16a and 16b in each block 17 are preferably provided in different positions with respect to the tire circumferential direction. With this, portion with much rubber volume in block is formed in a wide area in the tire circumferential direction.

In order to further decrease rolling resistance of the tire 1, the circumferential distance L3 between the peak point 16a and 16b in each block 17 is preferably set not less than 5%, more preferably not less than 7%, and preferably not more than 13%, and more preferably not more than 11% of the tread half width Twh.

In this embodiment, each peak point 16 of center blocks is provided in a position except for the center in a circumferential length of each side edge 15. Therefore, such side edge 15 has a first part 15a extending from the peak point 16 toward in the tire circumferential direction and a second part 15b with a length smaller than the first part 15a extending toward the opposite direction of the first part 15a from the peak point 16. This aspect of the tire 1 provides main grooves with unbalanced zigzag manner and thereby the tire 1 can also improve wet grip performance and noise performance.

Blocks 17 are also provided with a sipe 18 to improve wet grip performance due to capillary action and scratching effect thereof. In this embodiment, one sipe 18 is provided with in each block 17.

The sipe 18 includes a pair of main portions 18a, 18a and a joint portion 18b which connects between inner edges of each main portion 18a. In this embodiment, main portions 18a extend in parallel with each other, and it means that opened-ends of main portions 18a are provided at different positions with respect to the tire circumferential direction. Namely the sipe 18 extends in a step-like shape. Since such a sipe 18 has a large effective length, wet grip performance can be improved. Moreover, during cornering, divided block pieces 17a and 17b separated by the sipes 18 in each block 17 can support each other, and thereby rolling resistance of the tire 1 can be reduced due to less deformation of the block 17 in the tire axial direction.

In order to achieve the action described above, the joint portion 18b has a preferably circumferential length L4 of from 3 to 6 mm, and more preferably of from 4 to 5 mm. If the length L4 of the joint portion 18b is too large, some damages may happen in blocks 17.

The sipe 18 preferably has a width w6 of from 0.4 to 2.0 mm to maintain the rigidity of the tread portion 2 while keeping the capillary action thereof. If the width w6 is less than 0.4 mm, the capillary action thereof tends to decrease. On the other hand, if the width w6 is more than 2.0 mm, rolling resistance of the tire 1 tend to increase due to the low circumferential rigidity of the tread portion 2. From this point of view, the width w6 of the sipe 18 is preferably set in a range of from 1.0 to 1.5 mm.

The sipe 18 is preferably provided in the portion between the one peak point 16a and the other peak point 16b in blocks 12 or 13. With this, wet grip performance can be improved while preventing decrease of the rigidity of block 12 or 13.

Figure 4A:
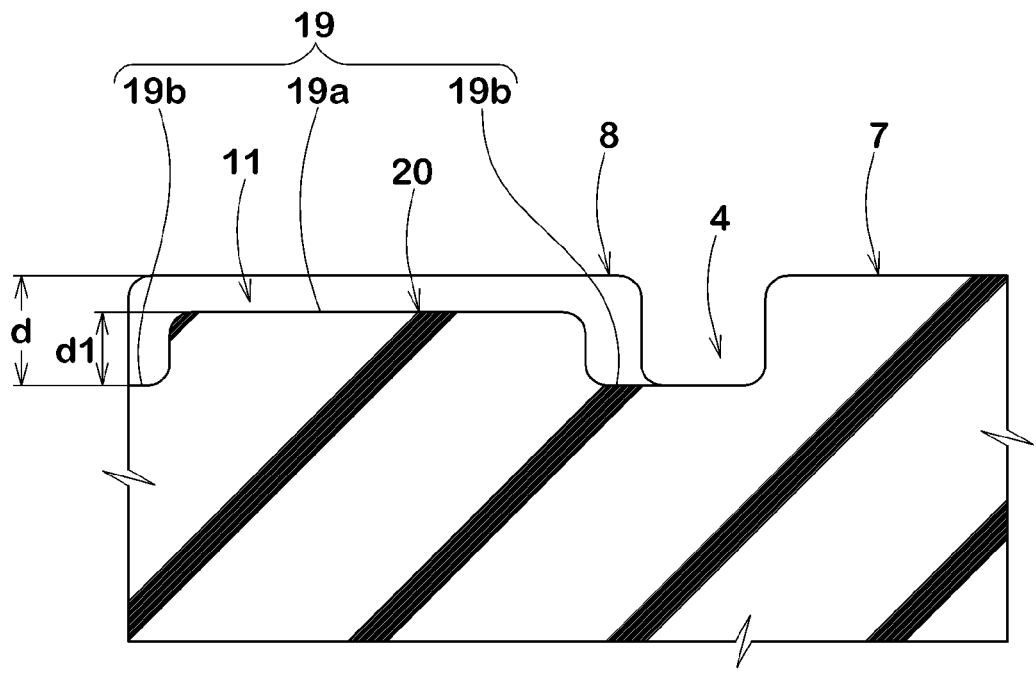
FIG. 4(a) is a cross sectional view taken along a line A-A of FIG. 1.
Figure 4B:
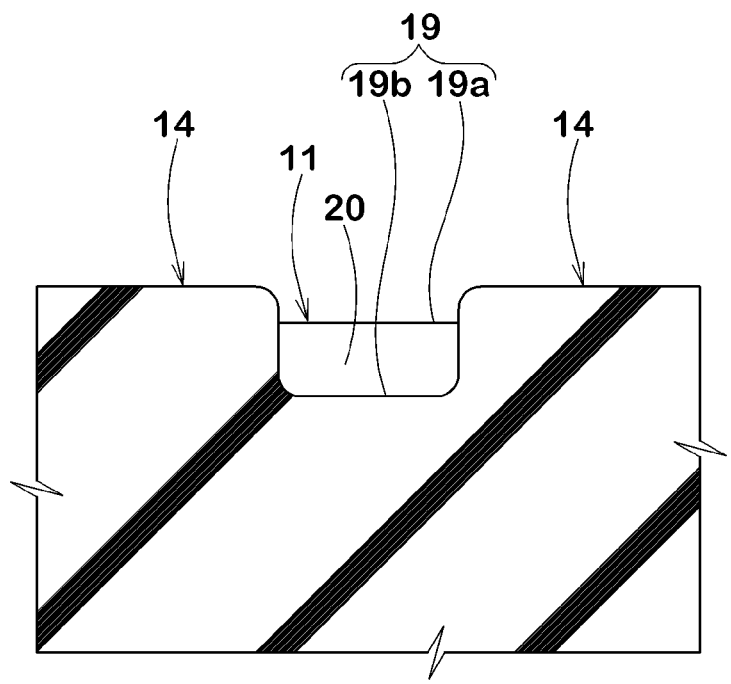
FIG. 4(b) is a cross sectional view taken along a line B-B of FIG. 1.

FIG. 4(a) shows a sectional view taken along a line A-A of FIG. 1, and FIG. 4(b) shows a sectional view taken along a line B-B of FIG. 1. Shoulder land portions 8 include shoulder blocks 14 separated by shoulder lateral grooves 11. As shown in FIGS. 4(a) and 4(b), each shoulder lateral groove 11 has a tie-bar 20 with a protruded surface in the tire radial direction at least partially and connects between adjacent shoulder blocks 14. Although shoulder land portions 8 are provided with shoulder lateral grooves 11 having large widths w5 as compared to the other lateral grooves, the circumferential rigidity of shoulder land portions 8 is maintained by providing the tie-bar 20 in shoulder lateral grooves 11, and thereby rolling resistance of the tire 1 may be reduced.

In order to improve the effect above, the tie-bar 20 preferably has a radial height d1 from the deepest bottom 19b of shoulder lateral grooves 11 in a range of from 70 to 85% of the groove depth d of shoulder lateral grooves 11. More preferably, the height d1 is set not less than 75%, and more preferably not more than 80% of the groove depth d of shoulder lateral grooves 11. When the height d1 of the tie-bar 20 is too small, circumferential rigidity of shoulder land portions 8 tends to decrease. When the height d1 of the tie-bar 20 is too large, wet grip performance may decrease.

The present invention is more specifically described and explained by means of the following Examples and References. It is to be understood that the present invention is not limited to these Examples.

Comparison Test

Heavy duty tires of size 315/80R22.5 with identical internal structures and same tread patterns as shown in FIG. 1 except for details shown in Table 1 were made and tested as follows.

Rolling Resistance Test:

The rolling resistance was measured with a rolling resistance tester under the following conditions. The results are indicated in Table 1 by an index based on Ex.1 being 100, wherein the larger the index number, the smaller the rolling resistance.

Wheel rim size: 9.00×22.5

Tire inner pressure: 660 kPa

Tire load: 85% of the standard load

Running speed: 80 km/h

Wet Performance Test:

The test tires were mounted on wheel rims above and installed in a 2-D tractor head provided with a ABS braking system and run on a wet asphalt road with a water film thereon with a thickness of from 1.4 to 1.6 mm at a speed of 60 km/h and a hard brake application was made. The braking distance to the stop was measured. The results are indicated in Table 1 by an index based on Ex.1 being 100, wherein the larger the index number, the better the wet performance.

TABLE 1-1

|  | Ref. 1 | Ref. 2 | Ref. 3 | Ref. 4 | Ex. 1 | Ex. 2 | Ex. 3 | Ex. 4 | Ex. 5 | Ex. 6 |
|---|---|---|---|---|---|---|---|---|---|---|
| Groove width W1/Tread half width Twh (%) | 8 | 1 | 6 | 1 | 3.5 | 3.5 | 3.5 | 3.5 | 2 | 5 |
| Distance L1/Tread half width Twh (%) | 19 | 19 | 19 | 19 | 19 | 15 | 23 | 19 | 19 | 19 |
| Groove width W2/Tread half width Twh (%) | 12 | 5 | 10 | 5 | 7.5 | 7.5 | 7.5 | 7.5 | 7.5 | 7.5 |
| Distance L2/Tread half width Twh (%) | 60 | 60 | 60 | 60 | 60 | 68 | 52 | 60 | 60 | 60 |
| Groove width W3 (mm) | 2.4 | 0.2 | 2.2 | 0.2 | 1 | 1 | 1 | 1 | 1 | 1 |
| Groove width W4 (mm) | 2.4 | 0.2 | 2.2 | 0.2 | 1 | 1 | 1 | 1 | 1 | 1 |
| Groove width W5/Tread half width Twh (%) | 10 | 5 | 10 | 5 | 7.5 | 7.5 | 7.5 | 7.5 | 7.5 | 7.5 |
| width W6 (mm) | 1 | 1 | 5 | 1 | 1 | 1 | 1 | 2 | 1 | 1 |
| Joint portion Length L4 (mm) | 4 | 1 | 4 | 4 | 4 | 4 | 4 | 2 | 4 | 4 |
| Tie-bar Height d1/Depth d (%) | 78 | 78 | 78 | 30 | 78 | 78 | 78 | 70 | 78 | 78 |
| Rolling Performance (Index) | 70 | 100 | 80 | 70 | 100 | 110 | 90 | 90 | 105 | 95 |
| Wet Performance (Index) | 110 | 85 | 110 | 90 | 100 | 90 | 110 | 105 | 95 | 105 |

|  | Ex. 7 | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|---|
| Groove width W1/Tread half width Twh (%) | 3.5 | 3.5 | 3.5 | 3.5 | 3.5 | 3.5 | 3.5 | 3.5 | 3.5 | 3.5 |
| Distance L1/Tread half width Twh (%) | 19 | 19 | 19 | 19 | 19 | 19 | 19 | 19 | 19 | 19 |
| Groove width W2/Tread half width Twh (%) | 6 | 9 | 7.5 | 7.5 | 7.5 | 7.5 | 7.5 | 7.5 | 7.5 | 7.5 |
| Distance L2/Tread half width Twh (%) | 60 | 60 | 60 | 60 | 60 | 60 | 60 | 60 | 60 | 60 |
| Groove width W3 (mm) | 1 | 1 | 0.4 | 2 | 1 | 1 | 1 | 1 | 1 | 1 |
| Groove width W4 (mm) | 1 | 1 | 0.4 | 2 | 1 | 1 | 1 | 1 | 1 | 1 |
| Groove width W5/Tread half width Twh (%) | 7.5 | 7.5 | 7.5 | 7.5 | 6 | 9 | 7.5 | 7.5 | 7.5 | 7.5 |
| Width W6 (mm) | 1 | 1 | 1 | 1 | 1 | 1 | 0.4 | 1 | 1 | 1 |
| Joint portion Length L4 (mm) | 4 | 4 | 4 | 4 | 4 | 4 | 4 | 3 | 6 | 4 |
| Tie-bar Height d1/Depth d (%) | 78 | 78 | 78 | 78 | 78 | 78 | 78 | 78 | 78 | 85 |
| Rolling Performance (Index) | 102 | 98 | 103 | 97 | 105 | 95 | 103 | 100 | 100 | 110 |
| Wet Performance (Index) | 98 | 102 | 97 | 103 | 98 | 102 | 97 | 99 | 102 | 95 |

From the test results, it was confirmed that the rolling resistance and wet performance of examples according to the present invention can be effectively improved as compared to references.

The invention claimed is:

1. A heavy duty tire comprising:
a tread portion provided with a pair of crown main grooves disposed on both sides of the tire equator and each extending continuously in the tire circumferential direction, and with a pair of shoulder main grooves each disposed axially outside the crown main grooves and extending continuously in the tire circumferential direction to form a crown land portion between the crown main grooves, a pair of middle land portions between the crown main grooves and the shoulder main grooves, and a pair of shoulder land portions disposed axially outside of the shoulder main grooves, wherein
the crown main grooves have groove widths in a range of from 2% to 5% of a tread half width which is an axial distance between the tire equator and a tread edge,
the shoulder main grooves have groove widths in a range of from 6% to 9% of the tread half width,
an axial distance between the tire equator and a centerline of one of the shoulder main grooves is in a range of from 52% to 68% of the tread half width,
a plurality of crown lateral grooves are provided on the crown land portion to form a plurality of crown blocks,
a plurality of middle lateral grooves are provided on the middle land portions to form a plurality of middle blocks,
a plurality of shoulder lateral grooves are provided on the shoulder land portions to form a plurality of shoulder blocks,
the crown lateral grooves and the middle lateral grooves are straight and have groove widths in a range of from 0.4 to 2.0 mm,
the shoulder lateral grooves have groove widths in a range of from 6% to 9% of the tread half width, and
each of the crown blocks, the middle blocks, and the shoulder blocks is provided with a sipe extending in a step-like shape, said sipe comprising a pair of main portions each extending from opposite side edges of the block toward the inside of the block at different positions with respect to the tire circumferential direction and a joint portion connecting between inner edges of each main portion.

2. The tire according to claim 1, wherein
each of the crown blocks has a pair of side edges extending in the tire circumferential direction,
each side edge of the crown blocks has a bent shape projecting axially outside of the block having a peak point being the outermost point thereof, and
the peak points are provided in different positions with respect to the tire circumferential direction in each crown block.

3. The tire according to claim 2, wherein
each of the sipes provided on the crown blocks comprises both ends that are communicated with the crown main grooves at a position other than the axially innermost points of the crown main grooves.

4. The tire according to claim 2, wherein
each peak point of the crown blocks is provided in a position except for the center in a circumferential length of each side edge.

5. The tire according to claim 4, wherein
each of the sipes provided on the crown blocks comprises both ends that are communicated with the crown main grooves at a position other than the axially innermost points of the crown main grooves.

6. The tire according to claim 1 or 2, wherein
each of the middle blocks has a pair of side edges extending in the tire circumferential direction,
each side edge of the middle blocks has a bent shape projecting axially outside of the block having a peak point being the outermost point thereof, and the peak points are provided in different positions with respect to the tire circumferential direction in each middle block.

7. The tire according to claim 6, wherein
each peak point of the middle blocks is provided in a position except for the center in a circumferential length of each side edge.

8. The tire according to claim 1 or 2, wherein
at least one of the shoulder lateral grooves has a tie-bar having a protruded surface in the tire radial direction and connecting between adjacent shoulder blocks.

9. The tire according to claim 8, wherein
the shoulder lateral grooves have groove depths,
the tie-bar has a height from a bottom of the shoulder lateral groove in a range of from 70% to 85% of groove depths of the shoulder lateral grooves.

10. The tire according to claim 1, wherein
the sipe has a width of from 0.4 to 2.0 mm, and the joint portion has a circumferential length of from 3 to 6 mm.

11. The tire according to claim 1, wherein
each of the crown main grooves extends in a zigzag manner having a plurality of axially innermost points, and
each of the crown lateral grooves extends so as to communicate between the axially innermost points of the crown main grooves.

* * * * *